March 17, 1942.  J. E. TRAINER  2,276,354
WELDING METHOD AND APPARATUS
Filed June 3, 1939  5 Sheets-Sheet 1

INVENTOR.
James E. Trainer
BY Rollin N. Holbrook
ATTORNEY.

March 17, 1942.　　　J. E. TRAINER　　　2,276,354
WELDING METHOD AND APPARATUS
Filed June 3, 1939　　　5 Sheets-Sheet 2
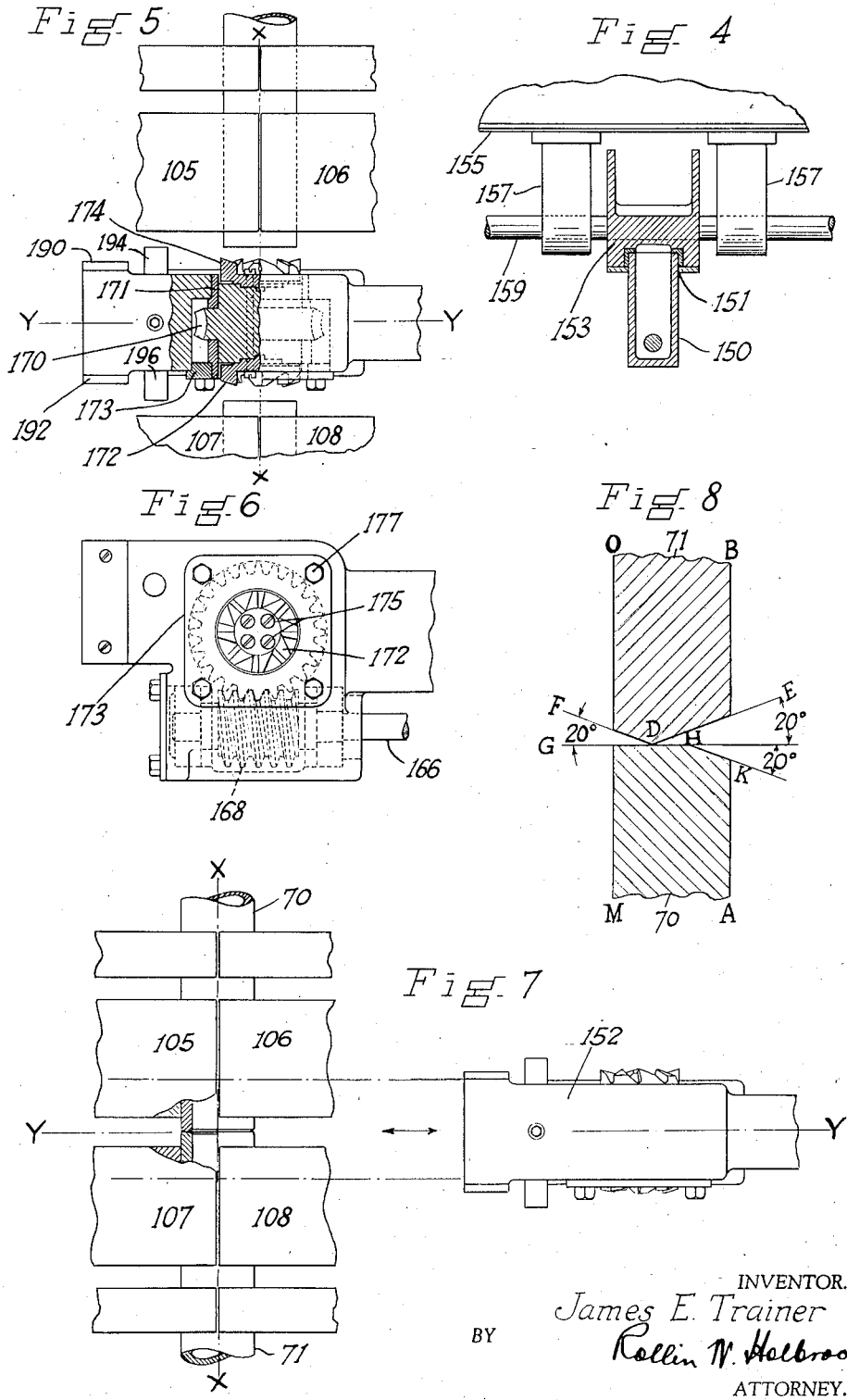
INVENTOR.
James E. Trainer
BY Rollin W. Holbrook
ATTORNEY.

March 17, 1942.　　　J. E. TRAINER　　　2,276,354
WELDING METHOD AND APPARATUS
Filed June 3, 1939　　　5 Sheets-Sheet 3
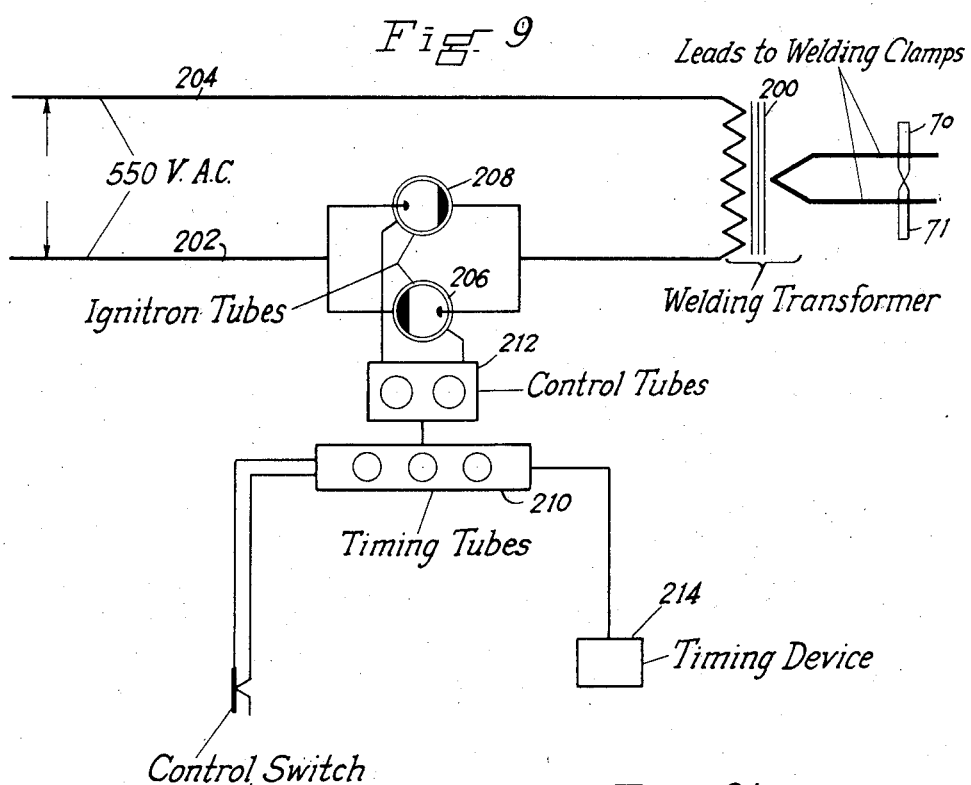
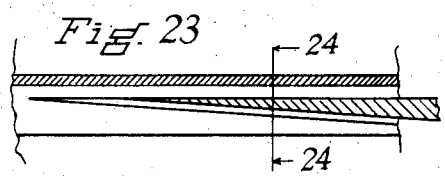
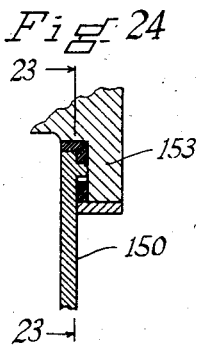
INVENTOR.
James E. Trainer
BY Rollin W. Holbrook
ATTORNEY.

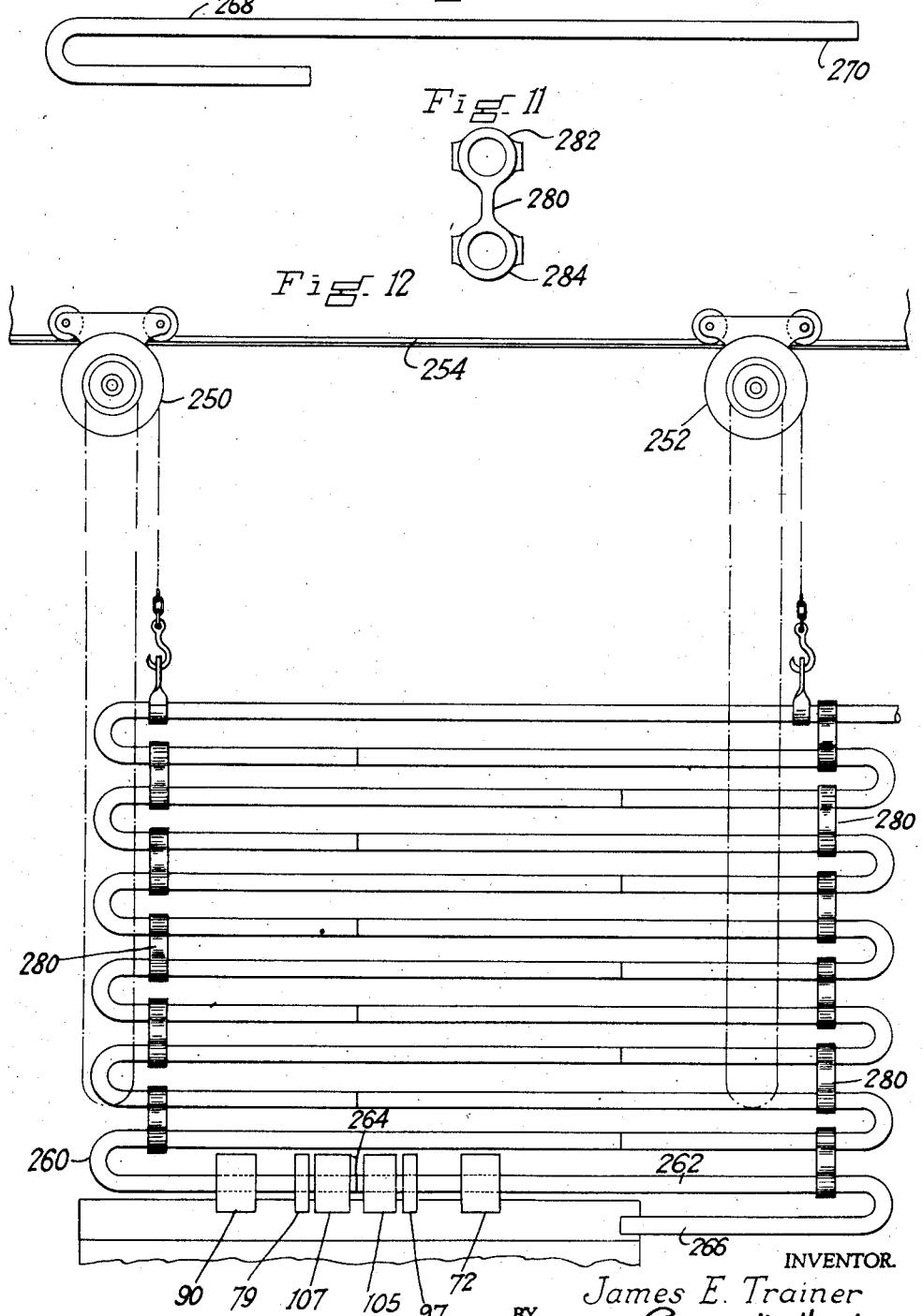

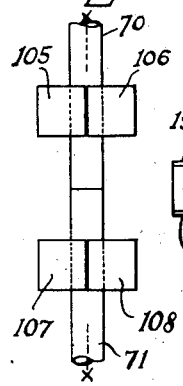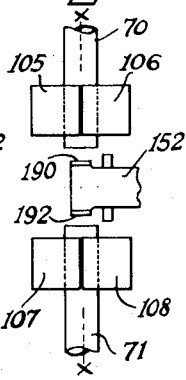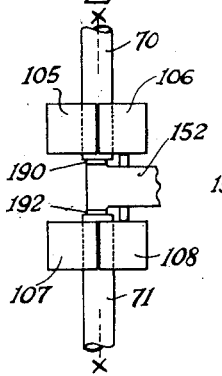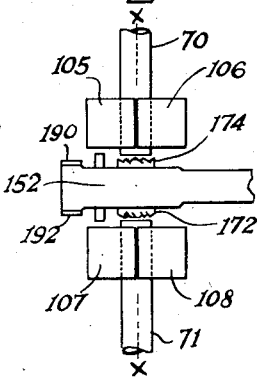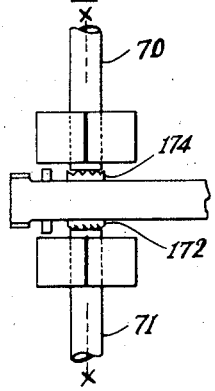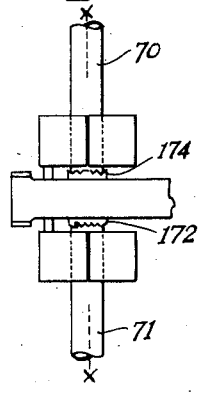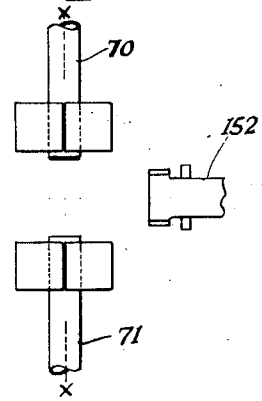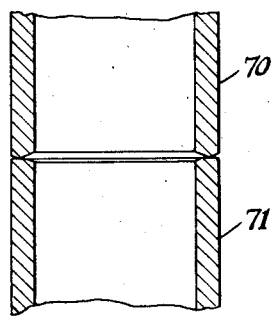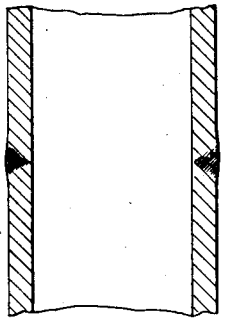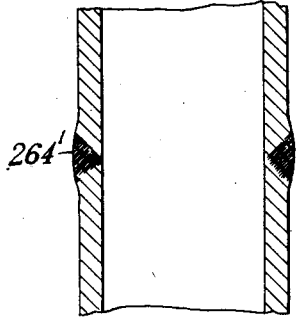

Patented Mar. 17, 1942

2,276,354

UNITED STATES PATENT OFFICE 2,276,354

WELDING METHOD AND APPARATUS

James E. Trainer, Fairlawn, Ohio, assignor to The Babcock & Wilcox Company, Newark, N. J., a corporation of New Jersey Application June 3, 1939, Serial No. 277,175

12 Claims. (Cl. 29—33)

This invention relates to a method of welding which is particularly advantageous in the resistance butt welding of tubes, rods, and other similar articles.

The invention also relates to the manufacture of large flat tubular coils, the above referred to welding method being particularly advantageous in the coil manufacture.

The invention further relates to machines or apparatus particularly adapted for carrying out the illustrative methods.

In successful resistance welding operations wherein tube-like or rod-like elements are butt welded, it is important that there be accurate predetermination of the area of initial contact of the elements to be welded and accurate predetermination of the relation of the zone of initial contact to other surfaces of those elements. When tubes are butt welded it is important that there be certain contours at the tube ends. This is not only important from the standpoint of effecting welds of good quality but also from the standpoint of elimination of welding burrs within the tube. To accomplish this result there must be positive assurance of exact parallelism between the surfaces to be welded and there must be accuracy of registration of the intended areas of contact. When tubular portions of the same diameter are welded, it is important that they be held fixedly in perfect axial alignment with the ends of these portions in parallel planes at right angles to the axis of the completed tube.

It is an object of the invention to provide apparatus and methods for accomplishing these results.

Among other objects of the invention is the provision of apparatus in which the elements to be welded are held fixedly in alignment while the ends of those elements are simultaneously machined, the machined ends of the elements are welded, and the weld heat treated or normalized. This machine, and the method performed by it, not only prevents distortion of the welded structure during the making of a weld, but it also effects considerable saving in the general welding operation, inasmuch as it eliminates the lost motion and excessive costs involved in machining of tube ends by one machine at a certain position, the removal of the tubes from the machining apparatus to welding apparatus at another position, the welding of the tubes, and the subsequent employment of separate heat treating operations effected by other independent apparatus. The invention contemplates the performance of all of these operations successively, with the tubes held in place in the illustrative machine. It also contemplates a welding method in which the welding current is accurately controlled to provide metal temperatures high enough for welding but not high enough to have any undesirable burning effect.

Other objects of the invention will appear in the following description which refers to the accompanying drawings.

In the drawings:

Fig. 4 is a vertical sectional view on the section line 4—4 of Fig. 2, showing the means whereby the upper part of the milling head frame is slidably interlocked with, and supported by, parts fixed with reference to the frame;

Fig. 5 is a view showing the relationship of the milling head to the tube ends to be welded. This view is partly a plan, and partly a horizontal section through the milling head;

Fig. 6 is a side elevation of the milling head;

Fig. 7 is a plan similar to Fig. 5 but showing the tube ends abutting and the milling head retracted;

Fig. 8 is a sectional view on a plane through the longitudinal axis of the tube. This view indicates the contour of tube ends after they are milled;

Fig. 9 is a diagrammatic view indicating controls for the welding circuit;

Fig. 10 is an elevation of one of the bent tubular elements utilized in the coil manufacture indicated in Fig. 12;

Fig. 11 is an elevation of a hanger one part of which may be slipped over the bent tubular element last welded and another part over one of said elements which is about to be welded to the assembled elements;

Fig. 12 is a diagrammatic view illustrating a method of manufacturing heat exchanger coils;

Figures 1, 2, 3:
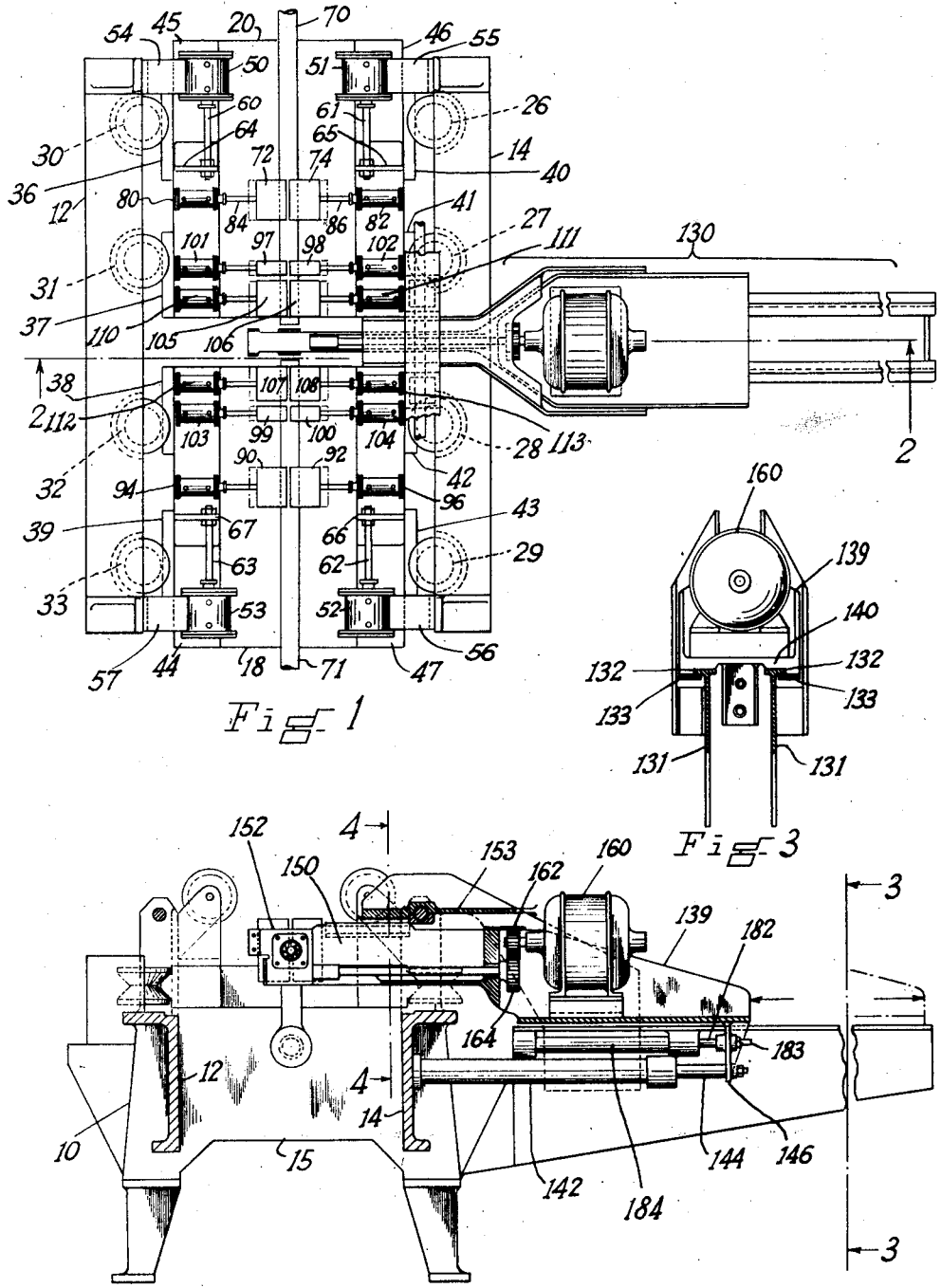
Fig. 1 is a plan showing apparatus for carrying out the illustrative method.
Fig. 2 is mainly a transverse vertical section on the line 2—2 of Fig. 1, with parts of the milling attachment shown in elevation.
Fig. 3 is a transverse vertical section on the section line 3—3 of Fig. 2, showing the trackway support and guide for the milling attachment, the motor for driving the milling head being shown in elevation.

Figs. 13–19, inclusive, are diagrammatic views illustrating successive steps of the welding method carried out in the operation of the illustrative apparatus;

Figs. 20, 21, and 22 are vertical sections of the treated tube sections, diagrammatically illustrating steps in the illustrative process;

Fig. 23 is a detail view indicating a manner in which the arm 150 may be guided along and interlocked with the bracket 153. This view is taken on the section line 23—23 of Fig. 24; and Fig. 24 is a detail view of the parts indicated in Fig. 23. This view is a transverse section taken along the section line 24—24 of Fig. 23.

Referring to Figs. 1 and 2 of the drawings, the apparatus includes a main frame 10 having the parallel longitudinal beams 12 and 14. They are rigidly supported by cross members 15, the entire main frame unit constituting a heavy base which is rigidly secured in position.

The longitudinal beams 12 and 14 serve somewhat as a base on which the rectangular auxiliary frames 18 and 20 are movably supported and guided, each auxiliary frame having a length about equal to one-half of that of the main frame.

The auxiliary frames 18 and 20 have movements longitudinally of the main frame and they are guided in such movements by V-type roller bearing members 26—33, rotatably mounted in bearings supported by the main frame beams 12 and 14. Correspondingly shaped ribs 36—43 operate in the grooves in these roller bearing members and they are held in such position by reason of their rigid relationship with the longitudinal frame members 44—47 of the auxiliary frames, these longitudinal members being rigidly connected by suitable cross members.

The movements of the auxiliary frames 18 and 20 toward or from the center of the apparatus and longitudinally of the main frame is effected by hydraulic or pneumatic apparatus including the cylinders 50—53 which are fixed by the brackets 54—57 to the ends of the longitudinal beams 12 and 14 of the main frame. Double acting pistons within these cylinders are connected by the piston rods 60—63 to brackets 64—67 rigid with the auxiliary frames.

Of the tubular members to be welded one of them is centered and fixed on one auxiliary frame and the other is similarly fixed to the other auxiliary frame in exact alignment with the first member as will be hereafter described. After they are thus fixed the members can be brought to abutting relationship (as diagrammatically shown in Fig. 13) or retracted therefrom by appropriate control of the fluid flow to and from the double acting cylinders 50—53.

The means for holding the tubular section 70 in the auxiliary frame 20 includes the complementary clamps 72 and 74 the inner faces of which present a circular opening of a radius substantially equal to the radius of the outside diameter of the tubular member. The clamps are preferably pivotally mounted at a position below the member 70 so that they may be moved to and from their operative positions by the double acting hydraulic cylinders 80 and 82. The latter are fixed respectively to the side frame members 45 and 46 of the auxiliary frame 20 and are associated with piston rods 84 and 86 which may be pivotally connected with the respective clamps 72 and 74. The latter are preferably constructed of metal which has a high degree of heat conductivity and they are preferably hollow so that a cooling fluid may be circulated through them.

The opposing auxiliary frame 18 has main tube clamps 90 and 92 which are similar to the clamps 72 and 74 and similarly connected with the double acting hydraulic cylinders 94 and 96 rigid with the auxiliary frame 18.

Inwardly of the main tube clamps are normalizing clamps 97—100, in most respects similar to the main tube clamps and similarly mounted and controlled by the double acting hydraulic cylinders 101—104. These normalizing clamps are preferably of smaller size and they are located much nearer the ends of the tubular members to be welded in order that the normalizing operation may be desirably controlled and limited.

Inwardly toward the center of the entire machine are the welding clamps 105—108. They are so mounted that facing surfaces of pairs of the clamps of the opposite auxiliary frames are closely adjacent the tube ends which are to be butt-welded. These welding clamps are also mounted in a manner similar to the mounting of the clamps above described, and their movements to and from their operative positions are controlled by the flow of fluid into the double acting hydraulic cylinders 110—113.

As some of the clamps 97—100 and 105—108 must carry an electric current of considerable magnitude when functioning as hereafter described, it is desirable that they be of a metal of high electrical conductivity, such as copper, and that they also be constructed for internal flow of a cooling fluid.

Control valves, not shown, are so associated with the double acting hydraulic cylinders that the tube clamps may be caused to grip the tube sections, or to release them, whenever those actions are required in the carrying out of the illustrative method.

Centrally of the machine and arranged for movement transversely of the main frame members 12 and 14 is a tube end forming device hereinshown as a motor driven milling attachment generally indicated by the numeral 130. This attachment is movably mounted on brackets 131 which are provided with horizontal guides 132 along which the milling attachment may be moved.

Slidably mounted on the horizontal guides 132 is a carriage 139. This carriage includes a milling cutter and the motor 160 for driving it, the motor being mounted upon a bed plate 140 which is part of the carriage. The bed plate slides upon the upper surfaces of the horizontal guides 132 as indicated in Fig. 3 of the drawings, and lower guide members 133, fixed on the carriage, engage the lower surfaces of the horizontal guides 132 to maintain the carriage in contact with the guides.

The carriage 139 is impelled toward or from the tube sections 70 and 71 by a double acting hydraulic ram 142, having a piston rod 144 connected to a bracket 146 which is fixed with reference to the carriage. The cylinder of the ram may be fixed to the beam 14 which constitutes a part of the main frame of the machine.

As the carriage moves its milling cutter into position between the tube sections 70 and 71, it is important that the movement of the carriage be stopped at a position in which the milling cutter is co-axial with the longitudinal axis of the aligned tubes 70 and 71. In the illustrative apparatus this is accomplished by an adjustable stop 182 carried on a cylinder 184. The cylinder may be fixed to the brackets 131 and the adjustable stop 182 may contact with an adjustable pintle 183 carried by the bracket 146.

The carriage 139 has rigid therewith a hollow arm 150 which supports the cutter head indicated at 152. The arm 150 moves through a slideway 151 which is formed in a bracket or frame 133 which, in turn, is fixed to the main frame of the machine. The slideway 151 in the bracket 153 is supported from the I-beam 155 through the brackets 157 and the tie-rod 159, as indicated in Fig. 4 of the drawings. The slideway and the top of the cutter arm 150 may be formed with interengaging tongued and grooved portions which co-operate to cause the arm 150 to be rigidly held to a fixed part of the frame in order that the cutter head may be accurately maintained in its operative position when the milling attachment carriage is moved so as to bring the cutter head into the position in which it is indicated in Figs. 2 and 5 of the drawings.

The worm wheel 170 of the cutter head is formed with counter-bores which fit raised portions on the faces of the cutters 172 and 174, and these cutters are held in place on the worm wheel by head screws 175. These screws thus key the cutters to the worm wheel to form a unitary cutter head. Power from the motor 160 is imparted to the cutter head by means of the spur gears 162 and 164, the shaft 166, and a worm 168 meshing with the worm wheel 170 and rotatable in bearings fixed with reference to the cutter head arm 150.

The worm wheel 170 is rotatably mounted in bushings 171 held in place by a cover plate 173 and the cap screws 177 which project through the plate.

Provided at the end of the cutter arm 150 opposite the motor 160 and normal to the longitudinal axis XX of the welding machine are provided demountable and interchangeable shims 190 and 192. These shims are mounted on the opposite side of the transverse axis Y—Y and at equal distances therefrom so as to act as stops to position the tube sections 70 and 71 in centralized relation with reference to the milling cutter. Other stops 194 and 196 are provided, one on each side of the transverse axis Y—Y of the cutter head, to act as gauges for the clamping jaws 105—108 and thus prevent the over-milling of the tube sections when the milling operation has been completed.

The milling attachment operating cycle

With the cutter head 152 located approximately at the position shown in Figs. 7 and 13 of the drawings and the tube clamps 105—108, as well as the other tube clamps, open the tube sections are placed in position to be gripped by the clamps, and the clamps 105—108 are partially closed by the appropriate control of fluid flow to the double acting cylinders 110—113.

The auxiliary frames 18 and 20 are then moved to such positions that there will be enough space between the tube end held by the clamps 105—106 and the tube end held by the clamps 107 and 108 to permit the cutter head to be moved into position between the tube ends. This action is indicated by Figs. 13 and 14 of the drawings. The ram 142 is then operated to move the cutter head 152 transversely toward the axis XX as indicated in Fig. 14 and it is brought to a stop with the centers of its shim plates 190 and 192 on that axis.

The tube clamps 105—108 and the tube sections 70 and 71 are then moved into contact with the shim plates by appropriate control of fluid flow to the hydraulic or pneumatic cylinders 50—53. This involves the movement of the auxiliary frames 18 and 20. This movement is continued until the tube ends contact the shims and the clamps engage the dowel pins or auxiliary stops 194 and 196 as indicated in Fig. 15, the tube clamps being opened, if necessary, and the tube sections 70 and 71 moved in order that the shims and stops will be properly contacted. After these contacts are properly made the clamps 105—108 are completely closed with pressure sufficient to keep the clamped tubes from moving relative to the clamping members. The auxiliary frames 18 and 20 are now moved backwardly from the central plane Y—Y and the cutter attachment is moved into the space between the tube ends (as indicated in Fig. 16) until the longitudinal axis of the cutter head is co-incident with the axis XX, the movement of the cutter head being stopped by the members 182—184. The tube ends are then moved against the cutters by control of the fluid flow to cylinders 50—53 and power is switched to the motor 160 and the cutters 172 and 174 start revolving. The auxiliary frames 18 and 20 are then moved toward the central axis Y—Y so that the tube ends are brought into contact with the revolving cutters (as indicated in Fig. 17) and the ends of the tubes are milled until this operation is brought to a termination by contact of the auxiliary stops 194 and 196 with the tube clamps 105—108 (see Fig. 18).

After the milling operation is completed the auxiliary frames 18 and 20 are then retracted (see Fig. 19) by appropriate control of fluid flow to the double acting cylinders 50—53 and the rotation of the milling cutter is stopped.

The ram 142 is then operated to retract the carriage 139 and the cutter head to the position at which it is shown in Figs. 7 and 19 of the drawings, it being understood that the tube clamps 72, 74, 90, and 92 supplement clamps 105—108 and hold the tube sections 70 and 71 rigid therewith during the milling operation and all subsequent operations constituting parts of the illustrative method.

The milling cutter is such as to shape the aligned and facing tube ends with the arrangement of the surfaces indicated in Figs. 8 and 20 of the drawings. Fig. 8 indicates a section through contacting ends on one side of the junction of tubes 70 and 71 with the line AB representing the inside surface of the tubes. With this formation the tubes will have a line contact along the circumference of a circle one point of which is indicated at D. The accurate machining of the tubes to give this circumferential line contact, and the maintenance of the machined surfaces in parallelism are features by which the present invention promotes the economical formation of high quality welds, and when the illustrative method is employed in the manufacture of heat exchanger coils the invention possesses the attribute of rapidly forming high quality welds without the production of any appreciable burr or any internal push-up of the metal within the tubes. Such defects are avoided by the particular relationship of the machined surfaces of the facing tube ends. Such surfaces are indicated in Fig. 8 of the drawings. They involve the surfaces indicated by the lines DE and DF, at the end of the tube section 71, and the surfaces GH and HK at the end of the tube section 70. These surfaces are so related that the circle D of initial contact of the tube ends when they are brought together for welding is well toward the outside surfaces of the tube section indicated by the line MO, and the surfaces represented by the lines FD and DE first meet the surface represented by the line GH at such point that any burr or push-up of the metal resulting from the subsequent welding operation is disposed externally of the resulting tube so that there will be no restriction of the flow area of the tube. The result of the welding action may be considered as indicated in Figs. 21 and 22.

The elimination of internal push-up of the metal is effected by the arrangement of the above indicated surfaces, the proper co-ordination and timing of the subsequent welding operation, and the relationship of the surfaces represented by the lines DH, HK, and DE of Fig. 8. As shown, the surfaces represented by the lines DE and GH form an angle of 20 degrees, and a similar angle is formed by continuation of the line GH and the surface represented thereby with the line HK and the surface represented by the latter line. Similarly, the surfaces represented by the lines FD and GH also form an angle approximately 20 degrees when the machined tube ends are brought into contact at the point D for welding.

Welding circuit control

The welding clamps 105—108 may be considered as terminals of an electric welding circuit which is brought into operation after these clamps are operated to grip the tubes with considerable pressure. The welding circuit is fed from a 22,000 volt high tension line through a 4500 k. v. a. transformer and the secondary voltage of this transformer, 550 volts, is fed through two ignitron power tubes to a welding transformer. This equipment is a part of the welding circuit which is schematically illustrated in Fig. 9 of the drawings. Here, the welding transformer is indicated at 200 as fed by the 550 volt line represented at 202 and 204. The ignitron tubes 206 and 208 are connected in parallel and inversely to each other, and are placed in series in the 550 volt power line as indicated. They are mercury arc rectifying tubes consisting of a single anode, a single mercury pool cathode, and a special ignitor, all enclosed in a steel tank which is evacuated by a pumping system. Each ignitron tube passes half-wave current when its ignitor is carrying current so that the tubes inversely connected in parallel pass full-wave current to the welder when the control circuit is operated.

The timing of the power supply is accomplished by means of an electronic circuit connected to the ignitors of the ignitron tubes. This electronic timer performs the function of a rapid acting, single throw, single pole switch and the electronic circuit measures out the required number of cycles of welding current at each operation of the welding switch. Upon the closing of the welding switch the timing tubes 210 reverse their grid potentials, causing the control tubes 212 to send current to the ignitor of the ignitron tubes, the latter thereupon arc and send power to the welding machine.

The duration of the welding period is determined by a timing condensor associated with the timing device 214. As the welding period progresses this gradually charges through a variable resistance located in the timing device and at the termination of the welding period, variable by means of adjustment of the timing device, the condenser is sufficiently charged to reverse the grid potential of a "stop" or "cut-off" tube. This stops the ignition of the power tubes and consequently the flow of power to the welding machine, and in this manner control of the welding circuit may be accurately timed for periods ranging from .02 second to 0.8 second. The Fig. 9 schematic diagram of the control of the welding circuit shows the leads to the welding clamps of the tube sections 70 and 71 to be directly in circuit with the secondary of the welding transformer 200.

The welding cycle

After the completion of the machining operation, and after the machine attachment with its cutter head 152 has been retracted by the operation of the ram 142, the flow of fluid to the hydraulic cylinders 50—53 is so controlled that the tube ends are again moved in toward the plane of the central axis Y—Y until the machined faces of the tube ends are in contact. Then, with the tube sections held fixedly in position by the pressure of the tube clamps thereagainst the welding current is switched on and there is a simultaneous application of end pressure to the tubes. High pressures are employed for forcing the tube ends toward each other but these pressures will vary with different tubes of different diameters and of different materials. For a 1.5 inch diameter tube, with a 0.126 inch wall, a pressure of 8000 lb. may be effectively used with a welding period of seven cycles (0.117 second). This is the interval of application of the welding circuit as automatically determined by the operation of the control apparatus above described.

With the above indicated procedure the welding takes place just after the tube ends have been machined. The tubes are still maintained in the same grips or clamps for both the machining and welding operations. This method not only assures an accurate welding set-up but it involves considerable advantage as a time saver.

Due to the heavy welding currents employed in the illustrative processes flashing between the electrode clamps and the tubes would occur if the contact between the clamps and the tubes was not sufficiently complete. It has been found that it is impossible to secure such complete contact with hot finished tubing as it is received from the mill and it has therefore been necessary to prepare the tube ends to be welded by cold swedging. The ends of each tube are, therefore, so prepared for a length of approximately 24 inches.

The normalizing cycle

After the weld is completed as above described the normalizing clamps 107—100 are operated by their hydraulic cylinders 101—104 to cause the tubes to be gripped with high pressure at the positions of those clamps. The welding clamps 105—108 are thereafter opened up so as to release the tubes at the positions of those clamps. The current is again switched on, and passing through the normalizing clamps 97—100 in automatically controlled amounts, it subjects the ends of the tubes to a normalizing heat treating operation to eliminate excessive residual stresses due to the welding. A photo-electric cell may be employed to control the circuit during the normalizing operation and to determine the maximum metal temperatures induced by that circuit.

The coil manufacture

The illustrative welding apparatus is advantageously employed in the manufacture of heat exchanger coils in the manner indicated in Fig. 12 of the drawings. This figure shows an incomplete coil, supported above the welding machine by chain hoists 250 and 252 portable along a trackway 254. As each weld is completed the hoists are operated to elevate the superposed coil sections to an extent sufficient to bring the next tube section into operative position between the electrode clamps of the welding apparatus.

Fig. 12 may be considered as showing the tube sections 260 and 262 in operative position between the welding clamps for the completion of a weld at 264. After the weld is completed at this position the clamps are released and the hoists 250 and 252 are operated so as to bring the longitudinal axis of the tube section 266 in alignment with the circular openings between the pairs of tube clamps. To bring this about the coil section above the welding machine is not only elevated but it must be moved as a unit laterally so as to bring the end of the tube section 266 into a position about mid-way of the tube clamps 105—107. The tube section 266 is then gripped by the tube clamps 72 and 74, and a return bend coil section such as that indicated at 268 in Fig. 10 of the drawings is placed in operative position so that the end portion 270 of its longer arm will be opposite the end of the portion 266 gripped by the clamps 72 and 74. The tube portion 270 is then gripped by the clamps 90 and 92 and the machining, welding, and normalizing operations above described are carried out.

Superposed tube sections of the successive coils may be tied together by hanger elements similar to that indicated at 280 in Fig. 11. This hanger element is of the Spectacle type involving the end loops 282 and 284 for the reception of the straight tubular sections of the coils.

When tie members, or hangers of the type indicated in Fig. 11, are used one of them will be slipped upon the tube section 260 before that section is gripped by the clamps of the welding apparatus. Similarly, the tie member will be slipped over the tubular portion 266 before it is placed in operative position in the welding apparatus. Thereafter, the individual return bend tube section 268 will have its long arm threaded through the tie member or hanger member 280 which has had its other end threaded upon the tubular portion 260 and this action will take place before the end portion 270 of the return bend tube 268 is clamped in welding position by the clamps 90 and 107. In this way, after the coil is removed from the welding machine, the fabrication of the coil has been practically completed.

Whereas, in compliance with the Revised Statutes, and particularly section 4888 R. S., the invention has been described with reference to the disclosure of a certain specific embodiment, it is to be appreciated that the invention is not limited to all of the details thereof. It is rather to be taken as of a scope commensurate with the scope of the subjoined claims.

What is claimed is:

1. In a resistance welding machine, relatively movable work holders for separately gripping metallic workpieces and maintaining them in a predetermined welding relationship and in the same grip during the machining of their opposing surfaces to welding contours and during the subsequent resistance welding of the workpieces at the machined surfaces, a retractible machining attachment to operative position, means for introducing said attachment between said opposing surfaces for effecting the machining operation, and said means also being operative reversely to withdraw said attachment from its operative position to permit the welding of the workpieces, and means for moving the work holders to bring the ends of the workpieces together subsequent to the machining operation.

2. The method of resistance welding which comprises separately fixing tubular workpieces so that they will be maintained accurately aligned and in welding relationship as they are moved to and from a forming and welding zone, then simultaneously preparing the welding faces of the workpieces with at least portions in parallelism for interfacial registering contact throughout said portions, engaging said portions in parallelism, and including the workpieces in a welding circuit for a co-ordinated pressure time temperature interval to integrally unite the workpieces throughout the areas of the welding faces.

3. A method of welding which comprises fixing and maintaining metallic workpieces in a predetermined relationship while they are moved to or from a machining and welding zone, simultaneously machining the opposing weld faces of the workpieces to weld determining contours by exerting converging pressures on the workpieces toward said zone and against an interposed machining head, directly thereafter engaging the machined faces, and including the workpieces in a welding circuit for a co-ordinated pressure time temperature interval to effect a welding of the workpieces at the machined faces, and then electrically normalizing the adjacent portions of the workpieces while they are still held in the said predetermined relationship.

4. The method of resistance welding which comprises separately fixing workpieces for relative movement so that they will positively be maintained in a predetermined welding relationship as they are moved to and from engagement, then machining the welding faces of the workpieces to weld determining contours for interfacial engagement in registration throughout prescribed areas, including the workpieces in a resistance welding circuit and simultaneously engaging the machined faces of the separately fixed workpieces for a co-ordinated pressure time temperature interval integrally uniting the articles metallically throughout the prepared areas.

5. In a method of welding, simultaneously machining the welding faces of two workpieces to registering and weld determining contours, pressing the contoured faces into engagement and simultaneously including the workpieces in an electrical welding circuit for a co-ordinated pressure time temperature interval to produce a weld at the engaged faces, and maintaining the workpieces in a certain predetermined relationship during said machining and welding operations.

6. A metal treating method which includes the simultaneous machining of the weld forming portions of two workpieces; resistance welding the workpieces at the machined faces; electrically normalizing the workpieces adjacent the weld; and maintaining the workpieces in the same predetermined relationship during said machining, welding, and normalizing operations.

7. In a resistance welding machine, means separately gripping two tubes and fixing them in axial alignment and maintaining them in that alignment during movements of one or both of the tubes to or from a welding zone between their adjacent ends, a double faced rotating machining head, means for removably introducing the machining head into the welding zone, means for simultaneously and equally moving the adjacent ends of the tubes toward each other and against the cutters of said head to cause the opposing faces of the tube ends to be machined to the desired contour, means retracting the machining head after the tubes are moved apart to release the head, and means introducing the tubes into an electric welding circuit after their machined ends are brought into engagement, said first named means maintaining the tubes in the same grip and in the same axial alignment during all of said operations.

8. In a resistance welding machine, means separately maintaining metallic workpieces in a predetermined welding relationship during convergent and divergent translatory movements of the workpieces permitting the simultaneous machining of the opposed surfaces of the workpieces and the subsequent pressing of the machined surfaces into welding engagement, a machining head, means interposing said head between said surfaces to subsequently permit the formation of weld determining contours by convergent movement of the workpieces against said head, and means for resistance welding the workpieces after said head has been retracted to permit said surfaces to be brought into welding engagement.

9. In a resistance welding machine, means fixing two endwise arranged tubes in axial alignment and maintaining them in such alignment during subsequent milling of the facing tube ends and resistance welding of milled ends; a retractible milling cutter; and means operating to cause the tubes to simultaneously and equally converge against the interposed cutter and to be reversely moved to allow the cutter to be retracted; said means also operating to move the milled ends of the tubes into engagement and pressing them together while a welding current is passed therethrough; all of these operations taking place while the tubes are maintained in their originally fixed axial alignment by the first named means.

10. In a method of manufacturing tubular coils each consisting of a plurality of return bend sections, forming tube lengths into similar return bend sections, clamping the complementary end portions of two return bend sections in axial alignment and in end-to-end relationship, machining the aligned ends to welding contours while they are thus clamped, resistance welding the machined ends together while they are clamped in the same relationship, supporting the welded sections and moving them so that the unwelded end of the last section is brought into welding position, and then similarly welding successive return bend sections until the complete coil is formed.

11. A method of manufacturing return bend heat exchanger coils; the method including the formation of similar return bend sections; assembling two of said sections and connecting hangers; clamping the complementary portions of the assembled return bend sections in axial alignment and in end-to-end relationship; machining the end faces of said complementary portions to welding contours while they remain in the clamped relationship; resistance welding said portions at the machined faces while they are held in their original alignment; moving the welded assembly and supporting it so that the unwelded end of the last welded section is brought into welding position; and effecting similar machining, assembling, and welding operations until the coil is completed.

12. In a method of manufacturing tubular coils each consisting of a plurality of return bend sections, forming tube lengths into similar U-bent sections each having a long and a short leg, operatively spacing the long leg of one section and the short leg of an adjacent section by slipping a spectacle-shaped spacer over those legs, clamping the complementary long and short legs of two return bend sections in axial alignment and in end-to-end relationship, machining the aligned ends to welding contours while they are thus clamped, resistance welding the machined ends together while they are clamped in the same relationship, supporting the welded sections and moving them so that the unwelded end of the last section is brought into welding position, and then similarly spacing and welding successive return bend sections until the complete coil is formed.

JAMES E. TRAINER.

CERTIFICATE OF CORRECTION.

Patent No. 2,276,354.　　　　　　　　　　　　　March 17, 1942.

JAMES E. TRAINER.

It is hereby certified that error appears in the printed specification of the above numbered patent requiring correction as follows: Page 5, second column, line 4, claim 1, strike out "to operative position" and insert the same before "between" in line 5, same claim, and line 7, same claim 1, strike out "and"; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.